United States Patent
Wiesenburger

(10) Patent No.: US 7,096,805 B1
(45) Date of Patent: Aug. 29, 2006

(54) LIQUID FERTILIZER APPLICATION SYSTEM

(76) Inventor: Brent W. Wiesenburger, 403 N. 1st St., Aberdeen, SD (US) 57401

( * ) Notice: Subject to any disclaimer, the term of this patent is extended or adjusted under 35 U.S.C. 154(b) by 0 days.

(21) Appl. No.: 11/207,984

(22) Filed: Aug. 19, 2005

(51) Int. Cl.
*A01C 7/00* (2006.01)
*A01C 9/00* (2006.01)
*A01C 23/00* (2006.01)

(52) U.S. Cl. ..................... 111/174; 111/127
(58) Field of Classification Search ........... 111/127, 111/170, 174, 119, 121, 200; 172/29, 31
See application file for complete search history.

(56) References Cited

U.S. PATENT DOCUMENTS

| | | | | |
|---|---|---|---|---|
| 791,465 A * | 6/1905 | Henderson | ............... | 111/170 |
| 2,874,878 A * | 2/1959 | Stokland | ............... | 222/624 |
| 2,912,944 A | 11/1959 | Snow et al. | ............... | 111/7 |
| 3,207,389 A | 9/1965 | Beebe et al. | ............... | 222/486 |
| 3,319,589 A | 5/1967 | Moran | ............... | 111/7 |
| 3,632,043 A | 1/1972 | Kirshmann et al. | ............... | 239/146 |
| 3,653,550 A | 4/1972 | Williams | ............... | 222/136 |
| 4,224,882 A * | 9/1980 | Cruse | ............... | 111/120 |
| 4,628,840 A | 12/1986 | Jacobson | ............... | 111/7 |
| 4,656,957 A | 4/1987 | Williamson et al. | ............... | 111/7 |
| 4,947,770 A | 8/1990 | Johnston | ............... | 111/121 |
| 4,998,488 A | 3/1991 | Hansson | ............... | 111/187 |
| 5,027,724 A | 7/1991 | Ptacek et al. | ............... | 111/121 |
| 5,269,237 A | 12/1993 | Baker et al. | ............... | 111/121 |
| 5,370,068 A | 12/1994 | Rawson et al. | ............... | 111/121 |
| 5,461,994 A | 10/1995 | Zimmerman | ............... | 111/121 |
| 5,477,792 A | 12/1995 | Bassett et al. | ............... | 111/121 |
| 5,622,124 A | 4/1997 | Smith et al. | ............... | 111/121 |
| 5,862,763 A | 1/1999 | Dietrich, Sr. | ............... | 111/121 |
| 6,006,684 A | 12/1999 | Whalen et al. | ............... | 111/121 |
| 6,095,065 A | 8/2000 | Dietrich, Sr. | ............... | 111/121 |
| 6,289,829 B1 | 9/2001 | Fish et al. | ............... | 111/121 |
| 6,363,870 B1 | 4/2002 | King | ............... | 111/121 |

* cited by examiner

*Primary Examiner*—Daniel P. Stodola
*Assistant Examiner*—Julianne Cozad

(57) ABSTRACT

A liquid fertilizer application system for efficiently dispensing and placing liquid fertilizer within a furrow to minimize germination injury. The liquid fertilizer application system includes a guard with an attached fertilizer tube having an input opening and a discharge opening. The discharge opening of the fertilizer tube is attached in front of the guard used to protect the implement seed tube. The discharge opening of the fertilizer tube forward of the seed tube allows for the application of the fertilizer into the prepared furrow prior to placement of the seed.

6 Claims, 7 Drawing Sheets

LIQUID FERTILIZER APPLICATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fertilizer applicators and more specifically it relates to a liquid fertilizer application system for efficiently dispensing and placing liquid fertilizer within a furrow to minimize germination injury.

2. Description of the Related Art

Any discussion of the prior art throughout the specification should in no way be considered as an admission that such prior art is widely known or forms part of common general knowledge in the field.

Fertilizer applicators have been in use for years. Typically, the placement of fertilizer in close proximity to seeds during the planting process is done to improve crop yields. Current applicators place fertilizer to the side of the seeds in the furrows, on top of the seeds in the furrows, in bands on the soil near the seed rows or broadcast on the soil above the seed rows. Unfortunately, current fertilizer applicators utilized in the farming industry directly apply fertilizer to the seed which results in burning of the seed thereby increasing germination injury.

While these devices may be suitable for the particular purpose to which they address, they are not as suitable for efficiently dispensing and placing liquid fertilizer within a furrow to minimize germination injury. Conventional fertilizer applicators tend to directly apply the fertilizer upon the seed thereby increasing germination injury.

In these respects, the liquid fertilizer application system according to the present invention substantially departs from the conventional concepts and designs of the prior art, and in so doing provides an apparatus primarily developed for the purpose of efficiently dispensing and placing liquid fertilizer within a furrow to minimize germination injury.

BRIEF SUMMARY OF THE INVENTION

In view of the foregoing disadvantages inherent in the known types of fertilizer applicators now present in the prior art, the present invention provides a new liquid fertilizer application system construction wherein the same can be utilized for efficiently dispensing and placing liquid fertilizer within a furrow to minimize germination injury.

The general purpose of the present invention, which will be described subsequently in greater detail, is to provide a new liquid fertilizer application system that has many of the advantages of the fertilizer applicators mentioned heretofore and many novel features that result in a new liquid fertilizer application system which is not anticipated, rendered obvious, suggested, or even implied by any of the prior art fertilizer applicators, either alone or in any combination thereof.

To attain this, the present invention generally comprises a guard with an attached fertilizer tube having an input opening and a discharge opening. The discharge opening of the fertilizer tube is attached in front of the guard used to protect the implement seed tube. Locating the discharge opening of the fertilizer tube forward of the seed tube allows for the application of the fertilizer into the prepared furrow prior to placement of the seed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a liquid fertilizer application system that will overcome the shortcomings of the prior art devices.

A second object is to provide a liquid fertilizer application system for efficiently dispensing and placing liquid fertilizer within a furrow to minimize germination injury.

Another object is to provide a liquid fertilizer application system that increases crop yield.

An additional object is to provide a liquid fertilizer application system that reduces fertilizer usage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1A:
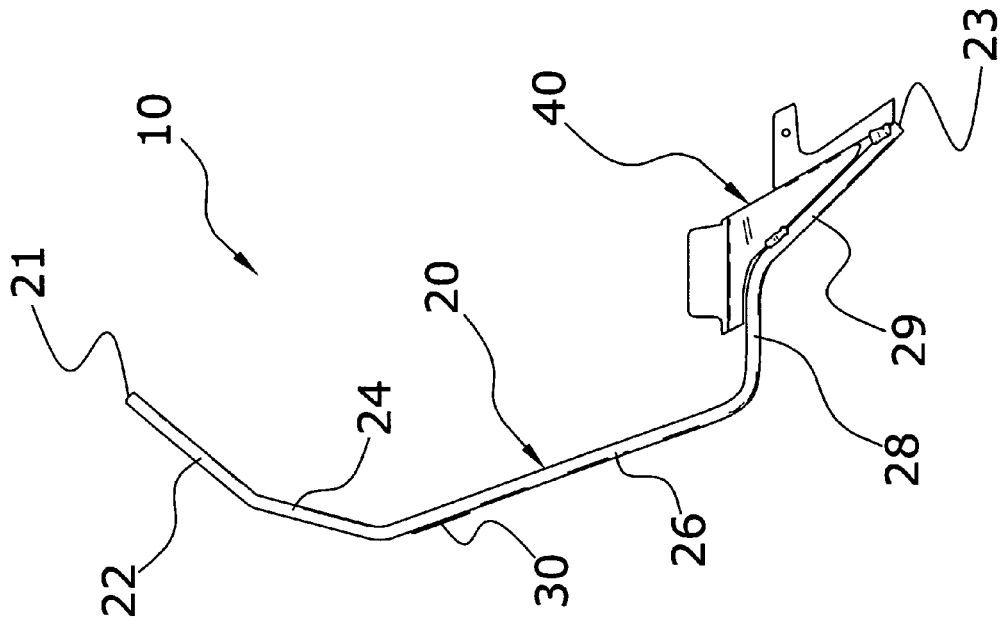
FIG. 1a is a side view of a guard and unattached fertilizer tube.

Turning now descriptively to the drawings, in which similar reference characters denote similar elements throughout the several views, FIGS. 1 through 7 illustrate a liquid fertilizer application system 10, which comprises a liquid fertilizer application system for efficiently dispensing and placing liquid fertilizer 12 within a furrow 16 to minimize germination injury. The liquid fertilizer application system 10 includes a guard 40 with an attached fertilizer tube 20 having an input opening 21 and a discharge opening 23. The discharge opening 23 of the fertilizer tube 20 is attached in front of the guard 40 used to protect the implement seed tube 17. The discharge opening 23 of the fertilizer tube 20 forward of the seed tube 17 allows for the application of the fertilizer 12 into the prepared furrow 16 prior to placement of the seed 14.

B. Guard

Figure 1B:
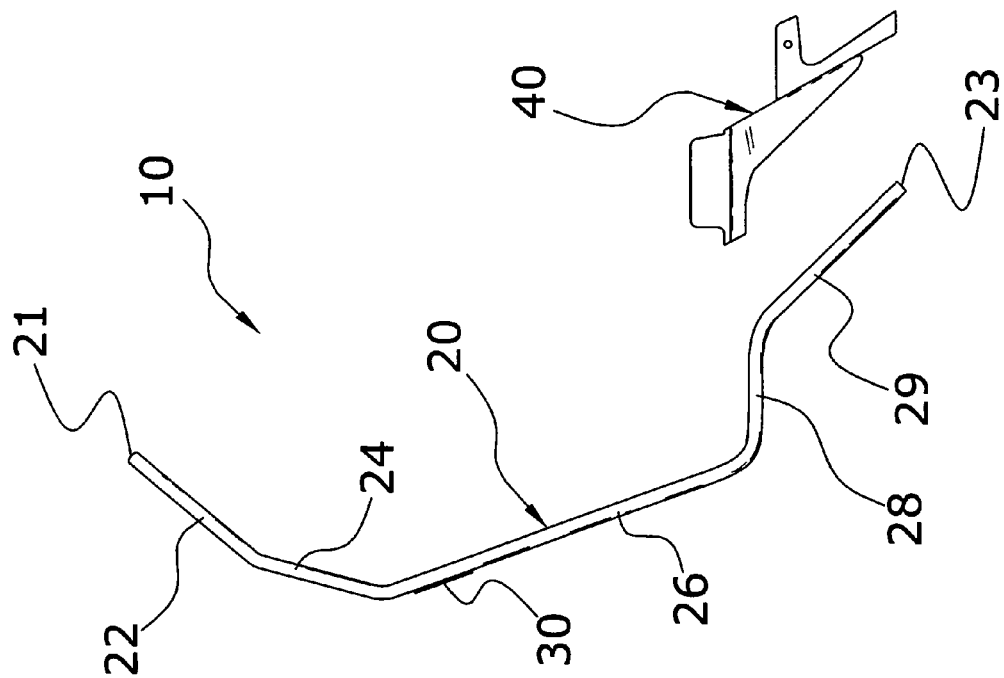
FIG. 1b is a side view of the present invention.

The guard 40 is attachable to a shank 15 of a planter as shown in FIGS. 1a and 1b of the drawings. The guard 40 is preferably comprised of product manufactured by DEERE AND COMPANY as part number A80203 which is provided on JOHN DEERE brand "XP" series planters fastened to each shank 15 for protection of the seed tubes 17.

The guard 40 is located in front of the seed tube 17 as shown in FIGS. 1a and 1b of the drawings. As the planter is pulled through the field, the guard 40 protects the seed tube 17 from any debris (e.g. rocks) that may be located in the path of the seed tube 17.

C. Fertilizer Tube

The fertilizer tube 20 is preferably made of a rigid material that will not significantly distort when welded to or when assembled onto the shank 15 of a planter implement. The fertilizer tube 20 is preferably made of a material which will withstand contact with chemicals normally used in farming operations and long periods of exposure to moisture such that it will not rust. The fertilizer tube 20 is preferably constructed of circular shaped tubular material, but is not limited to being only circular.

Figure 2:
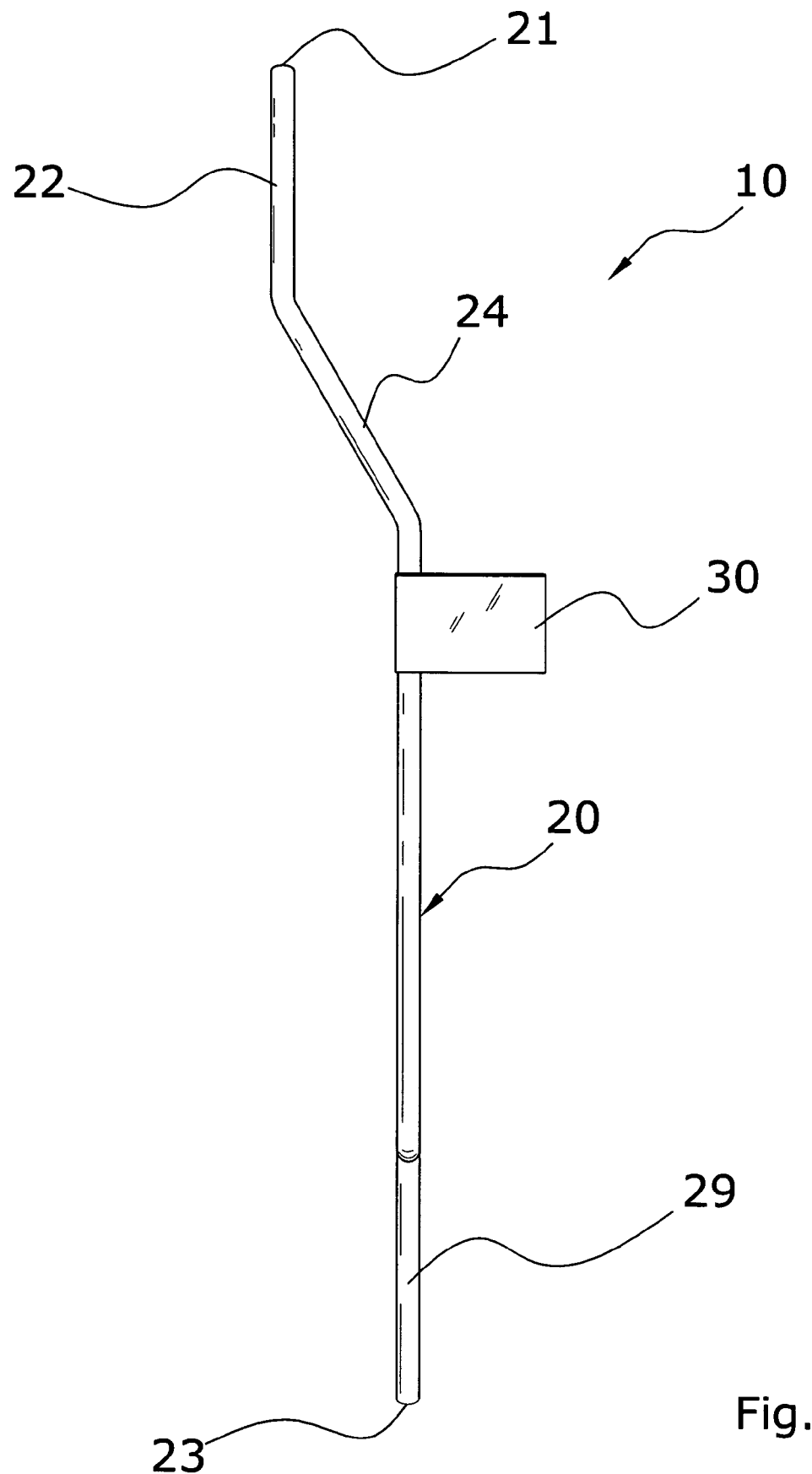
FIG. 2 is a front view of the present invention.
Figure 3:
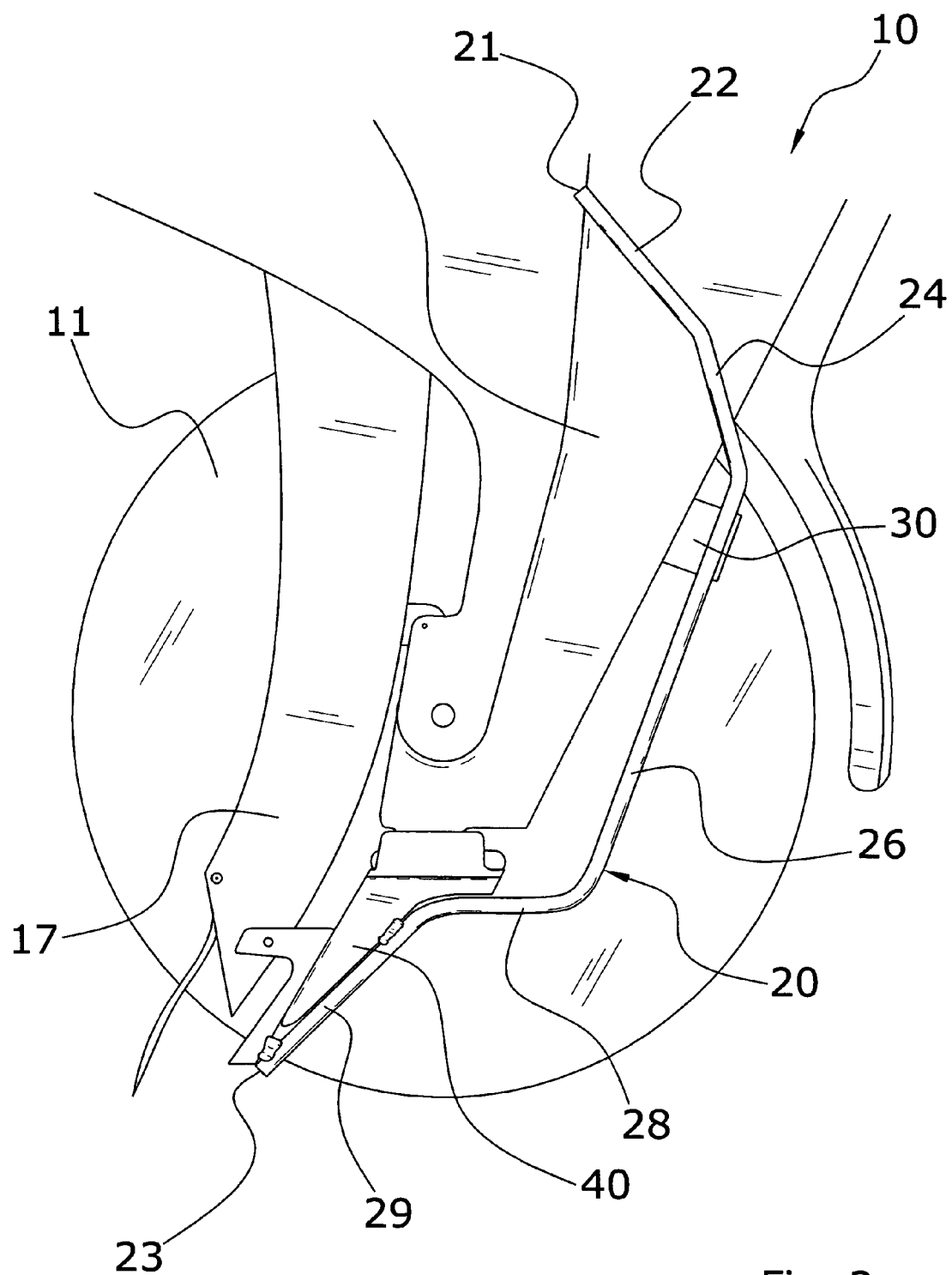
FIG. 3 is a side view of the present invention attached to a seed planter shank.
Figure 4:
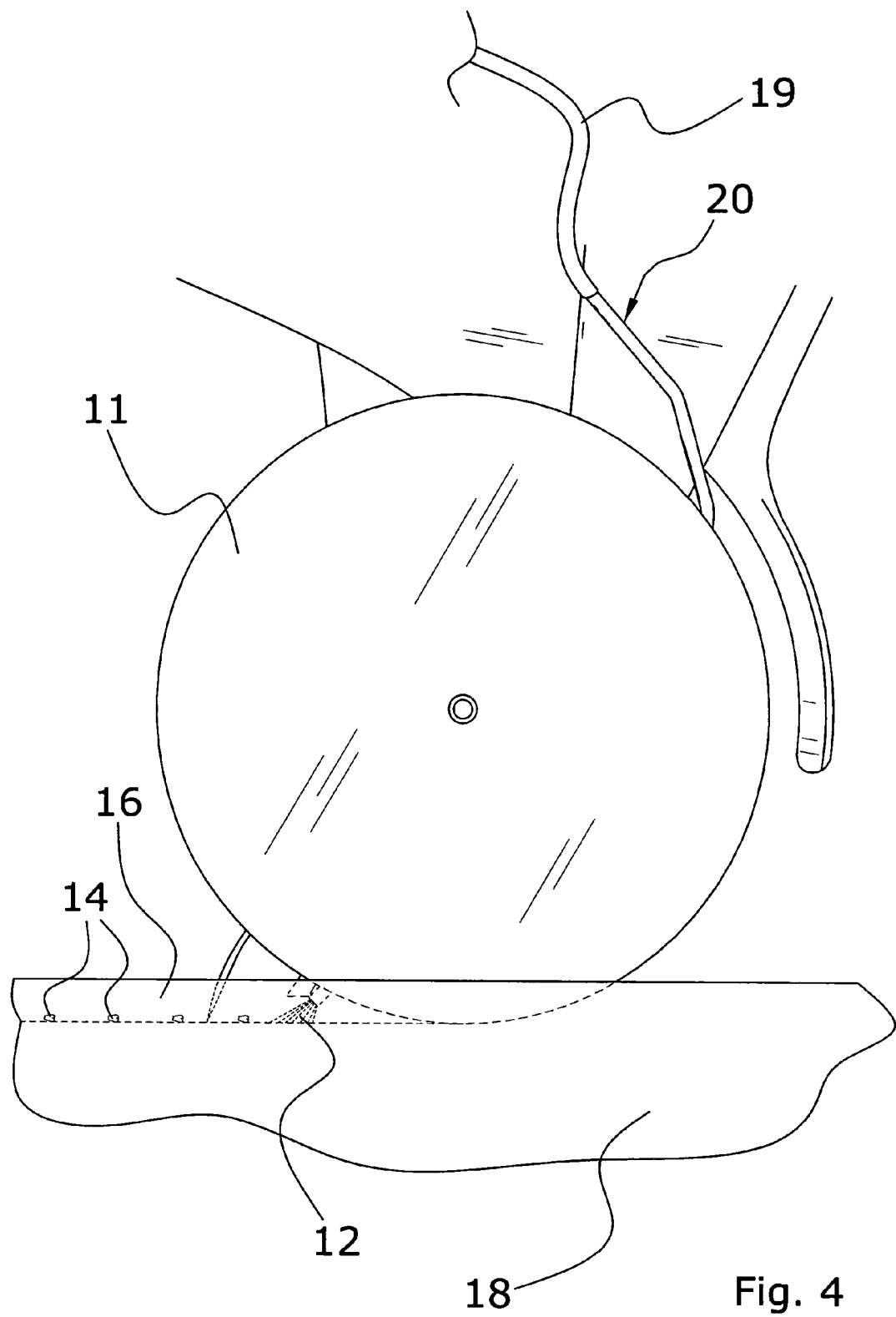
FIG. 4 is a side view of the present invention attached to a seed planter shank indicating the application of liquid fertilizer and seed planting.

As best shown in FIGS. 1 through 4, the fertilizer tube 20 is comprised of an input opening 21 and a discharge opening 23 connected by a series of leg extensions (a first segment 22, a second segment 24, a third segment 26, a forth leg 28, and a fifth segment 29). The input opening 21 located at the beginning of the first segment 22 of the fertilizer tube 20 is preferably connected to a fertilizer 12 reservoir located on the implement via a hose 19 as shown in FIGS. 4 through 6.

Figure 6:
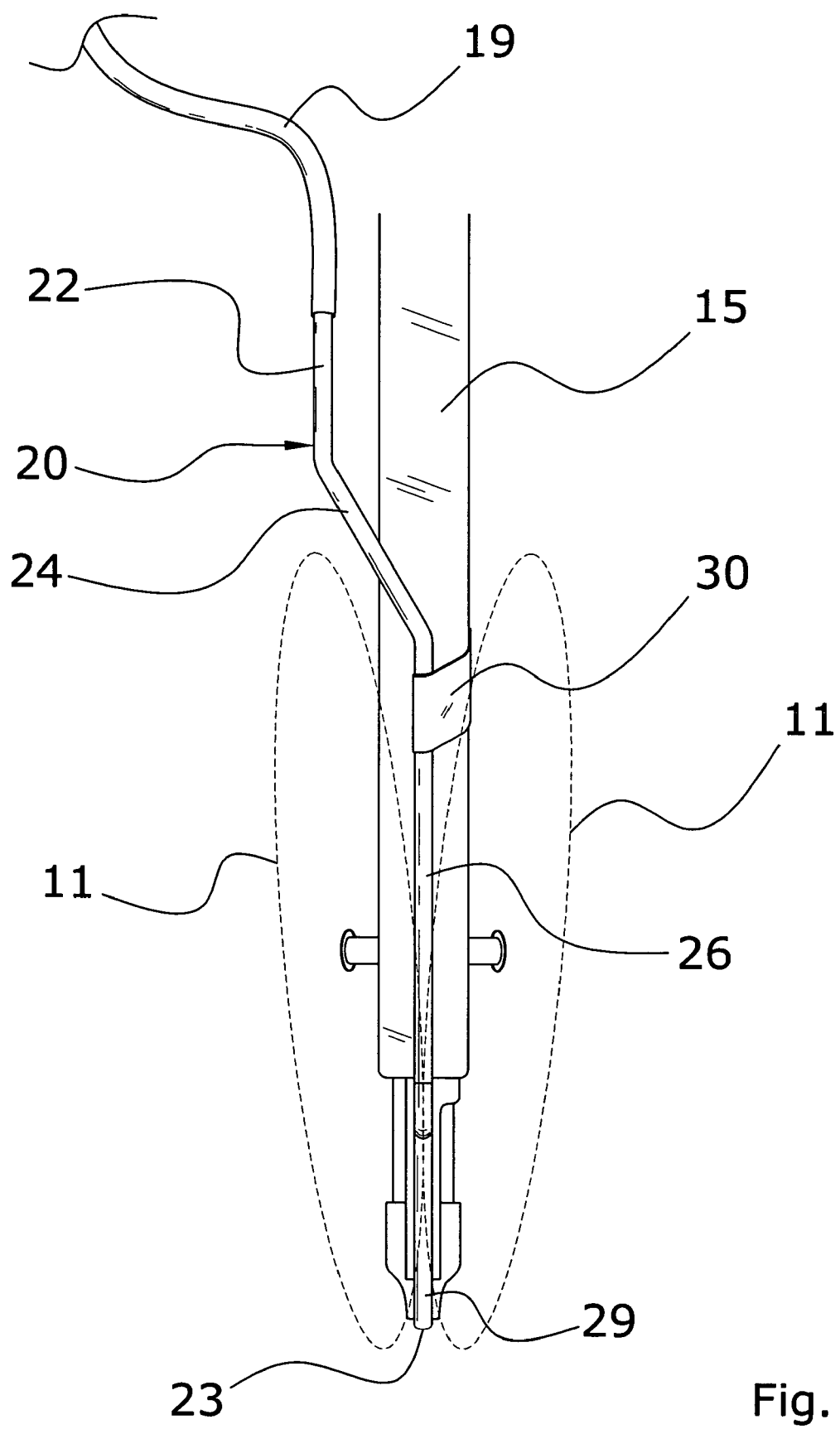
FIG. 6 is a front view of the present invention attached to a seed planter shank.

As further shown in FIG. 6, the first segment 22, the input opening 21, and the hose 19 are maintained at a distance away from the shank 15 of the planter implement to eliminate any contact with the shank 15. Vibrational contact of the fertilizer tube 20 or the hose 19 against the shank 15 could result in a puncture of either the fertilizer tube 20 or the hose 19 and consequently the leak of fertilizer 12.

Figure 5:
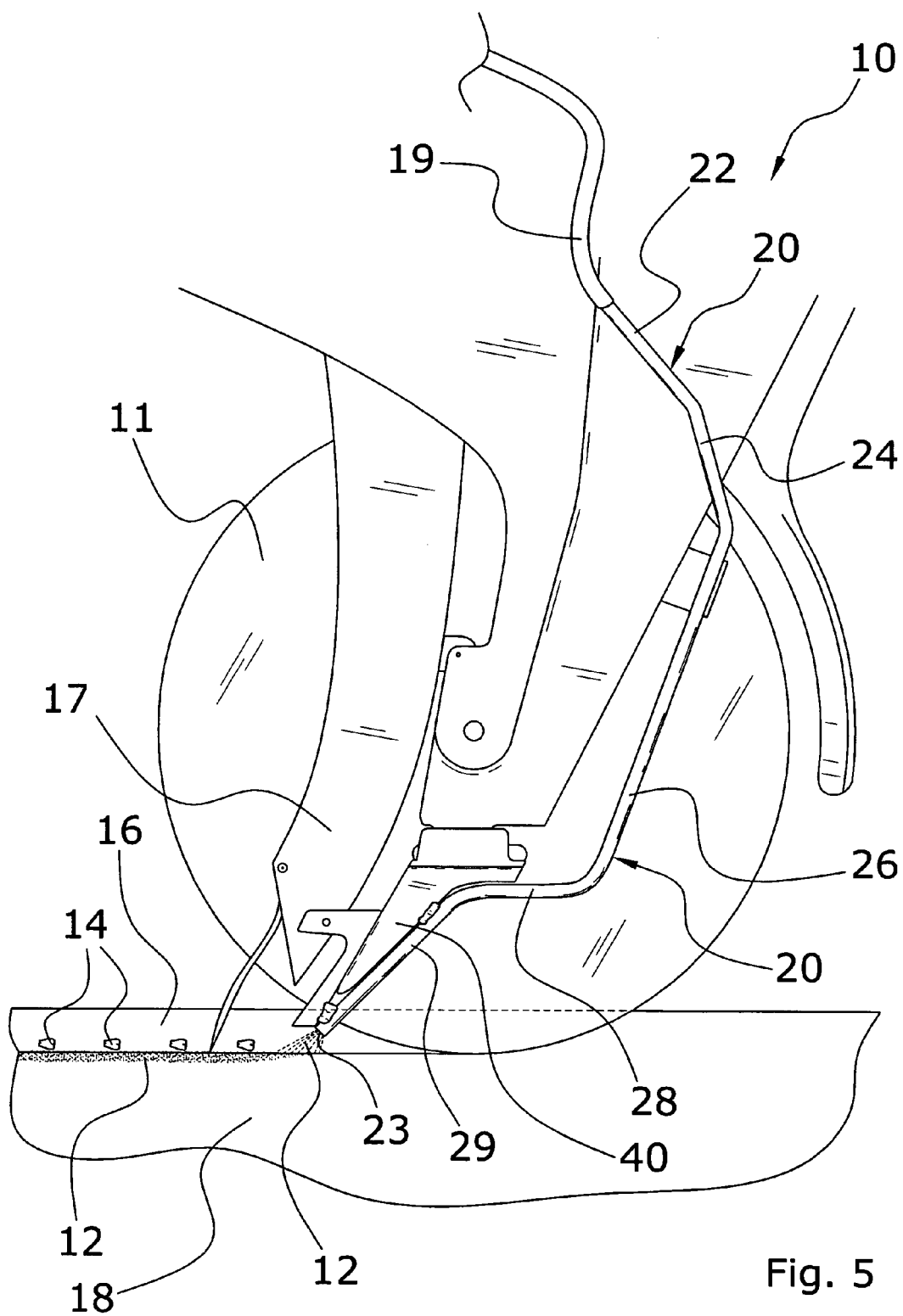
FIG. 5 is a side view of the present invention attached to a seed planter shank with one disk removed indicating the application of liquid fertilizer and seed planting.

As best shown in FIGS. 1, 3 and 5 the discharge opening 23 located at the end of the fifth segment 29 of the fertilizer tube 20 is attached in-line with the guard 40. The fertilizer tube 20 and guard 40 are preferably welded together, but it can be appreciated by one skilled in the art that other fastening methods could be utilized. The discharge opening 23 is also preferably attached slightly below the guard 40 so that the fertilizer 12 discharge does not come in contact with the guard 40 during the application process.

The segments 22, 24, 26, 28, 29 of the fertilizer tube 20 are preferably bent at preset angles in order to route around the shank 15 structure of the implement. The first segment 22 is bent up in relation to the second segment 24 preferably forming an angle of approximately 160 degrees. The second segment 24 is positioned with a compound bend in relation to the third segment 26. As shown in FIGS. 1, 3 and 5, the second bend of the fertilizer tube 20 required for the second segment 24 is bent up preferably forming an angle of approximately 160 degrees in relation to the third segment 26. As shown in FIG. 2, the third bend of the fertilizer tube 20 required for the second segment 24 is bent at an angle of approximately 150 degrees in relation to the third segment 26. As best shown in FIGS. 1, 3 and 5, the third segment 26 of the fertilizer tube 20 is bent up preferably forming an angle of approximately 120 degrees in relation to the horizontal forth leg 28. Again, as best shown in FIGS. 1, 3 and 5, the fifth segment 29 of the fertilizer tube 20 is bent down preferably forming an angle of approximately 135 degrees in relation to the horizontal forth leg 28. The importance of the final bend which creates the fifth segment 29 is that this bend must substantially match the structure of the guard 40 in order to obtain proper attachment to the guard 40.

D. Tab

The tab 30 is made of a rigid yet formable and weldable metal material. As shown in FIGS. 1 and 2, the tab 30 is attached to the fertilizer tube 20, preferably welded to the third segment 26 of the fertilizer tube 20. The tab 30 is located with its top edge slightly below the tangency point of the compound bend between the second segment 24 and the third segment 26. The tab 30 is further located tangent to the fertilizer tube 20 and positioned perpendicular to the guard 40, best shown in FIGS. 1 and 2.

As shown in FIGS. 3, 5 and 6 the tab 30 is formed after being attached to the fertilizer tube 20 and after the liquid fertilizer application assembly 10 is attached to the shank 15 of the implement. As best shown in FIG. 6, the tab 30 is formed around the third segment 26 of the fertilizer tube 20 and further bent parallel and in contact with the right surface of the shank 15. The tab 30 is placed in contact with the shank 15 to minimize movement of the fertilizer tube 20.

E. Operation of the Invention

In use, a liquid fertilizer application system 10 is attached to each shank 15 of a planter implement. A liquid fertilizer application system 10 is procured by attaching both a guard 40 and a tab 30 to a fertilizer tube 20. The fertilizer tube 20 is attached in front of the guard 40 with the discharge opening located slightly below the guard 40. The tab 30 is located on the third segment of the fertilizer tube 20 extending perpendicular to the guard 40.

The guard 40 casting is attached to the shank 15 by means of a pin-like feature cast into the bottom the shank 15 and a locating pin extending through the seed tube 17. As best shown in FIGS. 3, 5 and 6, during assembly of the liquid fertilizer application assembly 10 to the shank 15, the fertilizer tube 20 is routed around the shank 15 so as not to come into contact with the shank 15. After the fertilizer tube 20 is properly located, the tab 30 is bent over the fertilizer tube 20 to come in contact with the side of the shank 15 as best shown in FIG. 6. This is repeated for each shank 15 on the planter implement.

Following the installation of each liquid fertilizer application system 10 to each shank 15 on the planter implement, a hose 19 is attached to each fertilizer tube 20 input opening 23 as shown in FIGS. 4, 5 and 6. Each hose 19 comes from a fertilizer 12 reservoir or manifold and supplies the fertilizer 12 to each liquid fertilizer application system 10.

Figure 7:
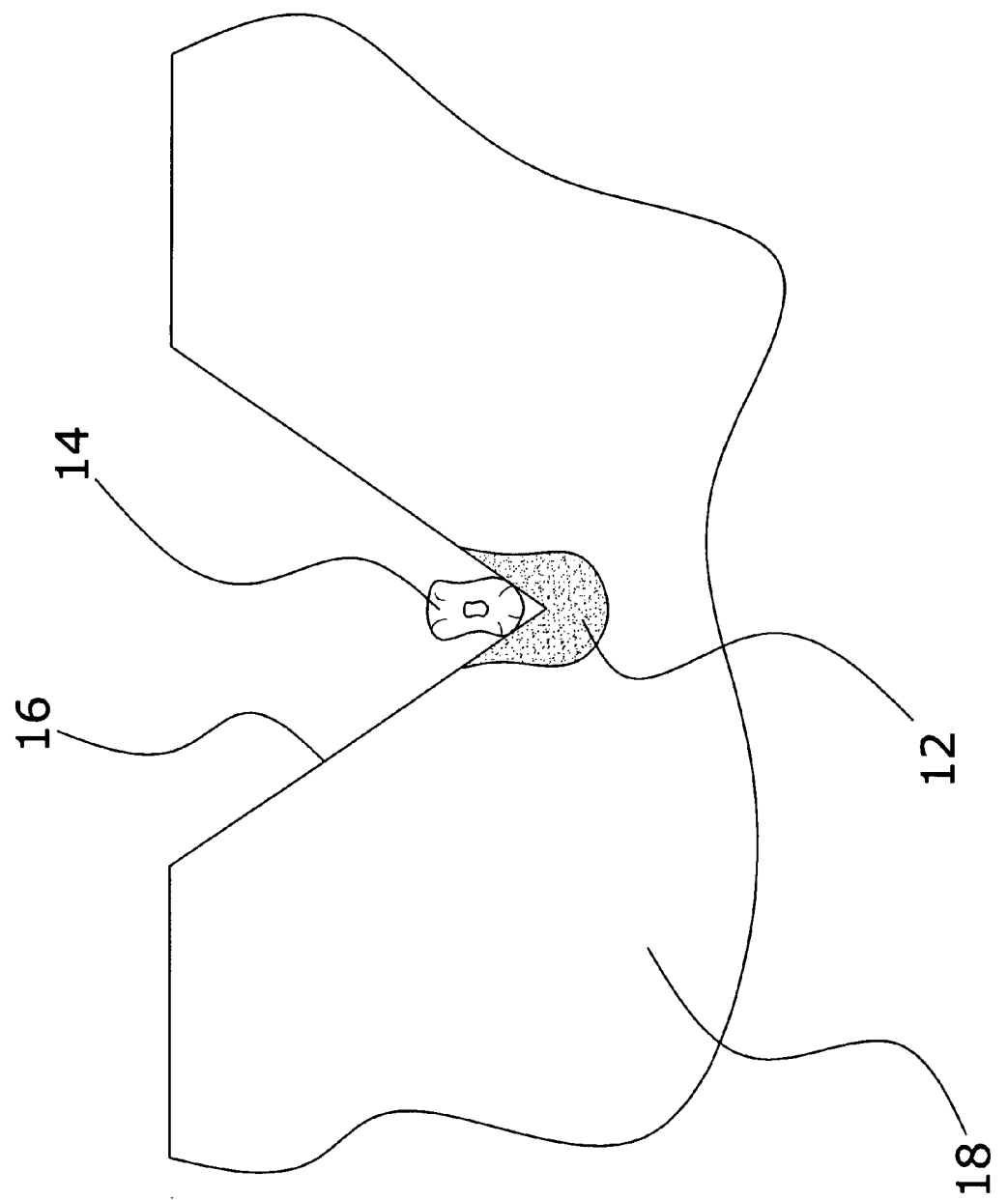
FIG. 7 is a front view of a seed located in a furrow with applied fertilizer.

As best shown in FIGS. 4, 5 and 7, as the planter implement is pulled through the soil 18, the disk 11 creates a V-shaped furrow 16. This is a common seed preparation method used in the farming industry. The discharge opening 23 following the disk 11 then emits the fertilizer 12 onto the lower surface of the furrow 16 in preparation for the dispersment of the seed 14 as shown in FIG. 7. As shown in FIGS. 5 and 7, the seed 14 is placed above the fertilizer 12 within the furrow 16 and finally covered with soil 18.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A fertilizer applicator, comprising:
a guard attached to a shank of a planter, wherein said guard has a front end and a rear end; and
a fertilizer tube including an input opening to receive a flow of fertilizer and a discharge opening for dispensing said flow of fertilizer;
wherein said fertilizer tube is comprised of an elongated tubular structure;
wherein said fertilizer tube is attached to said front end of said guard;
wherein said fertilizer tube includes a first segment, a second segment, a third segment, a fourth segment and a fifth segment;
wherein said fifth segment is attached to said front end of said guard;
wherein said discharge opening is positioned within said fifth segment;
wherein said discharge opening is at a bottom end of said fertilizer tube;
wherein said fifth segment extends forwardly and upwardly with respect to said guard;
wherein said fourth segment extends forwardly from said fifth segment opposite of said discharge opening in a horizontal manner;
wherein said third segment extends forwardly and upwardly from said fourth segment opposite of said fifth segment;
wherein said second segment extends rearwardly and upwardly from said third segment;
wherein said first segment extends rearwardly and upwardly from said second segment;
wherein said first segment extends upwardly at an angle less than said second segment with respect to a horizontal plane;
wherein said input opening is positioned within said first segment;
wherein said input opening is at an upper end of said fertilizer tube;
wherein said first segment is positioned above said second segment, said third segment, said fourth segment and said fifth segment;
wherein said second segment is positioned above said third segment, said fourth segment and said fifth segment;
wherein said third segment is positioned above said fourth segment and said fifth segment;
wherein said fourth segment is positioned above said fifth segment.

2. The fertilizer applicator of claim 1, including a tab extending substantially transversely from said third segment.

3. The fertilizer applicator of claim 2, wherein said tab is welded to said third segment of said fertilizer tube.

4. The fertilizer applicator of claim 2, wherein said attached tab is welded substantially perpendicular to said guard.

5. The fertilizer applicator of claim 2, wherein said tab is comprised of a flat and straight structure.

6. The fertilizer applicator of claim 2, wherein said fertilizer tube is welded to said front end of said guard.

* * * * *